United States Patent [19]

Gudat

[11] Patent Number: 4,852,674

[45] Date of Patent: Aug. 1, 1989

[54] METHOD FOR DISPLAYING LOAD DISTRIBUTION BY MONITORING A WORK VEHICLE SUSPENSION

[75] Inventor: Adam J. Gudat, Edelstein, Ill.

[73] Assignee: Caterpillar Inc., Peoria, Ill.

[21] Appl. No.: 246,027

[22] Filed: Sep. 14, 1988

Related U.S. Application Data

[63] Continuation of Ser. No. 79,559, Jul. 30, 1987, abandoned.

[51] Int. Cl.[4] .................... G01G 19/10; G01G 23/32
[52] U.S. Cl. .................................. 177/141; 177/178; 177/DIG. 10
[58] Field of Search ............... 177/136, 177, 178, 141, 177/208, 209, DIG. 10

[56] References Cited

U.S. PATENT DOCUMENTS

| | | | |
|---|---|---|---|
| 2,255,814 | 9/1941 | Roche | 177/208 X |
| 2,867,433 | 1/1959 | Bergenheim et al. | 177/208 X |
| 3,581,836 | 6/1971 | Segerdahl | 177/208 X |
| 4,076,088 | 2/1978 | Gallo et al. | 177/177 X |
| 4,328,494 | 5/1982 | Goodall | 177/DIG. 10 |
| 4,511,974 | 4/1985 | Nakane et al. | |
| 4,516,116 | 5/1985 | White | |
| 4,542,799 | 9/1985 | Komoto | 177/177 |
| 4,566,547 | 1/1986 | Furukawa | 177/177 X |
| 4,635,739 | 1/1987 | Foley et al. | 177/45 |
| 4,651,838 | 3/1987 | Hamilton et al. | 177/209 |
| 4,691,792 | 9/1987 | Shintani | 177/208 X |

FOREIGN PATENT DOCUMENTS

| | | |
|---|---|---|
| 0210274 | 2/1987 | European Pat. Off. |
| 2428245 | 1/1980 | France |
| 1405174 | 9/1975 | United Kingdom |
| 2136141 | 9/1984 | United Kingdom |
| 2147444 | 5/1985 | United Kingdom |

OTHER PUBLICATIONS

N.T.I.S. Technical Notes published Jul. 1984.

Primary Examiner—George H. Miller, Jr.
Attorney, Agent, or Firm—Robert E. Muir

[57] ABSTRACT

In the field of off-highway trucks, overloading and disproportionate load placement lead to undesirable vehicle stresses. The present invention pertains to an apparatus for displaying the distribution of the load, in an off-highway truck, to both the truck operator and the loader operator. The information is conveyed to the operators using displays having varying color ranges generally indicative of the load in portions of the dump body of the truck. Using this tool the truck operator attains optimum positioning of the truck prior to and during the loading cycle, while the loader operator directs loads to portions of the dump body having lower displayed loads.

24 Claims, 8 Drawing Sheets

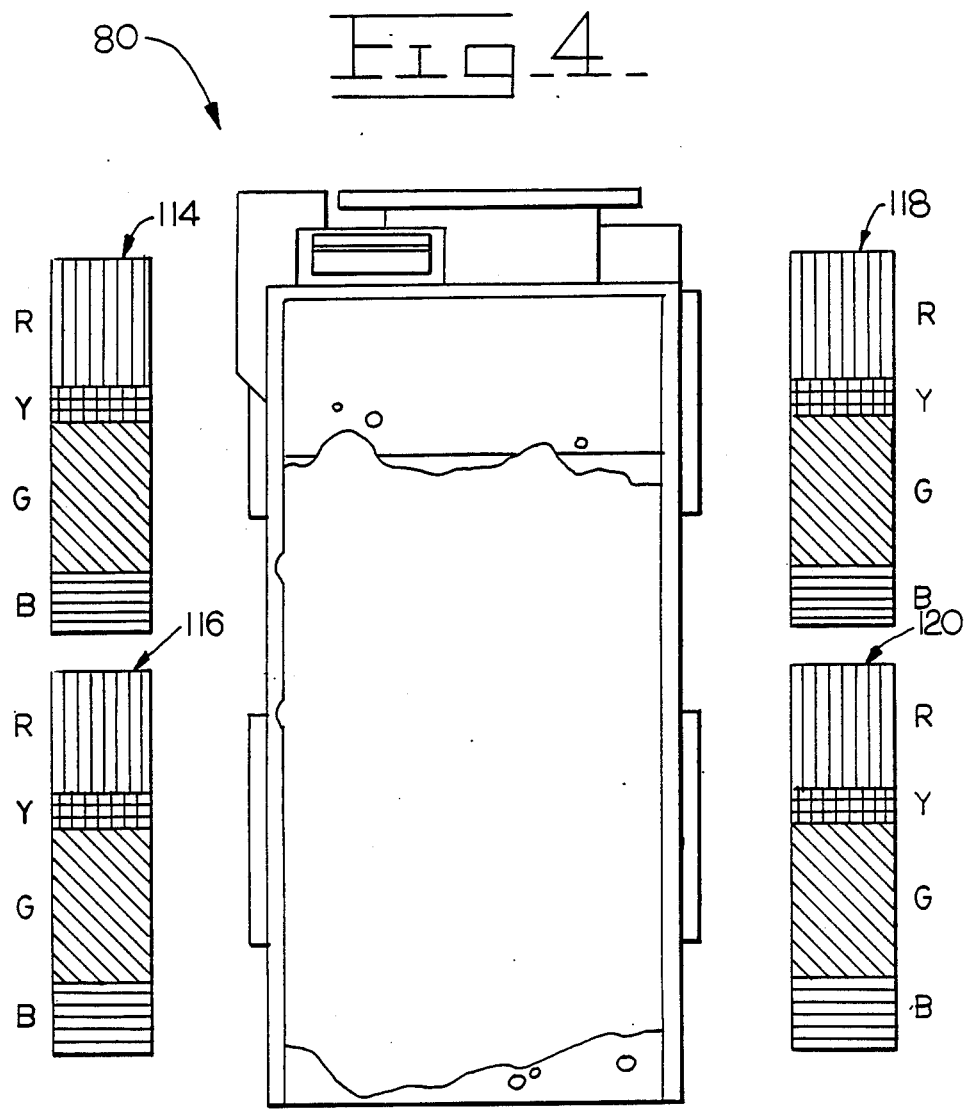

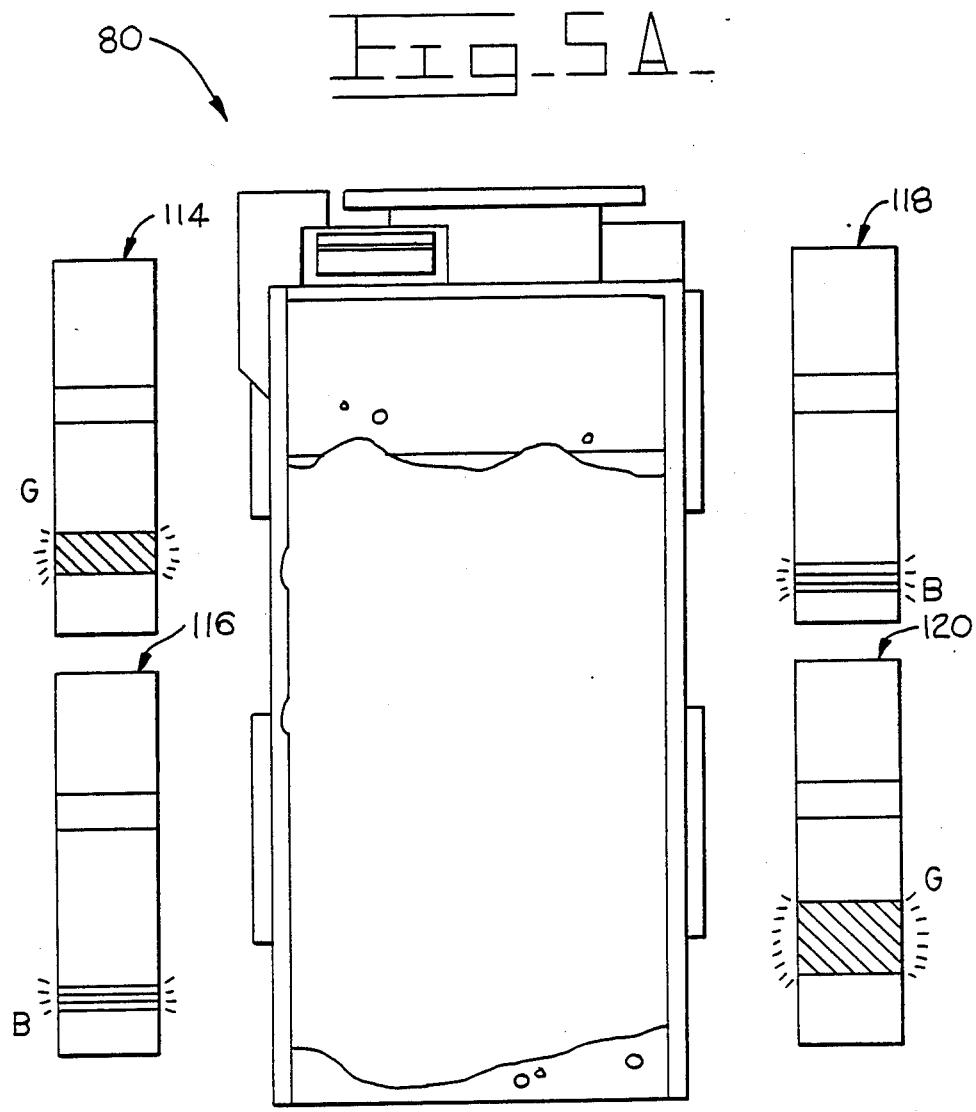

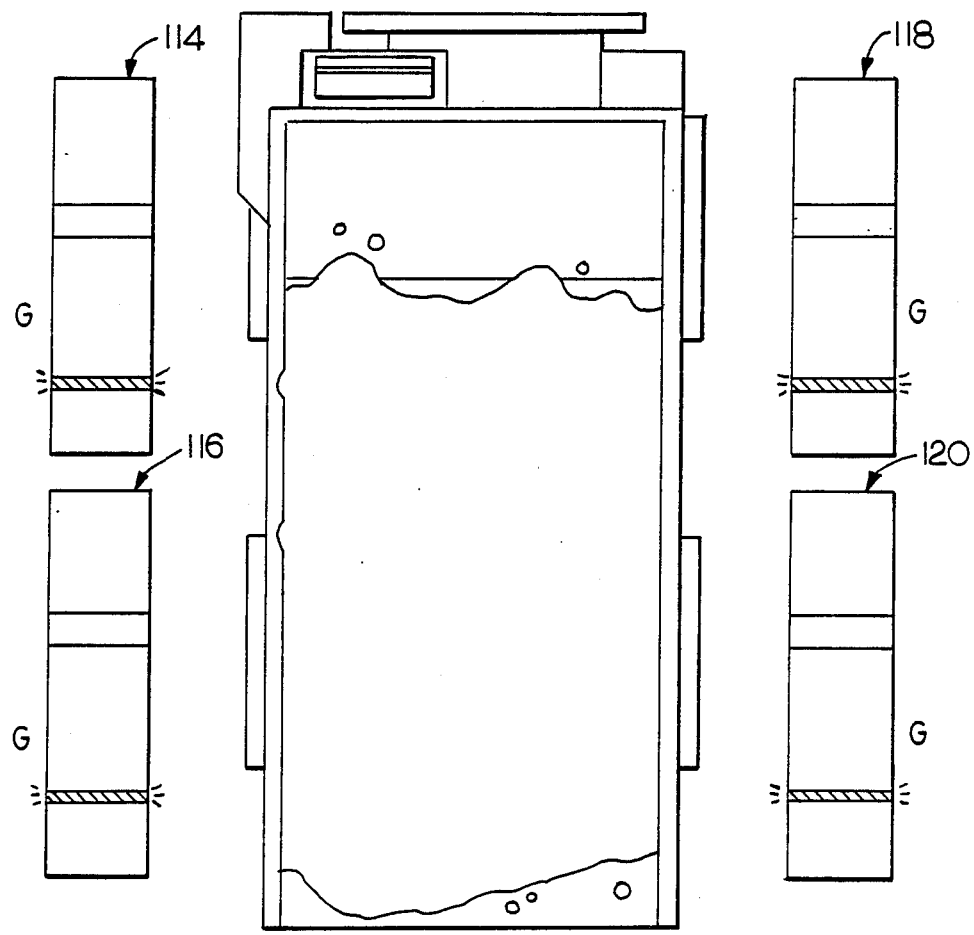

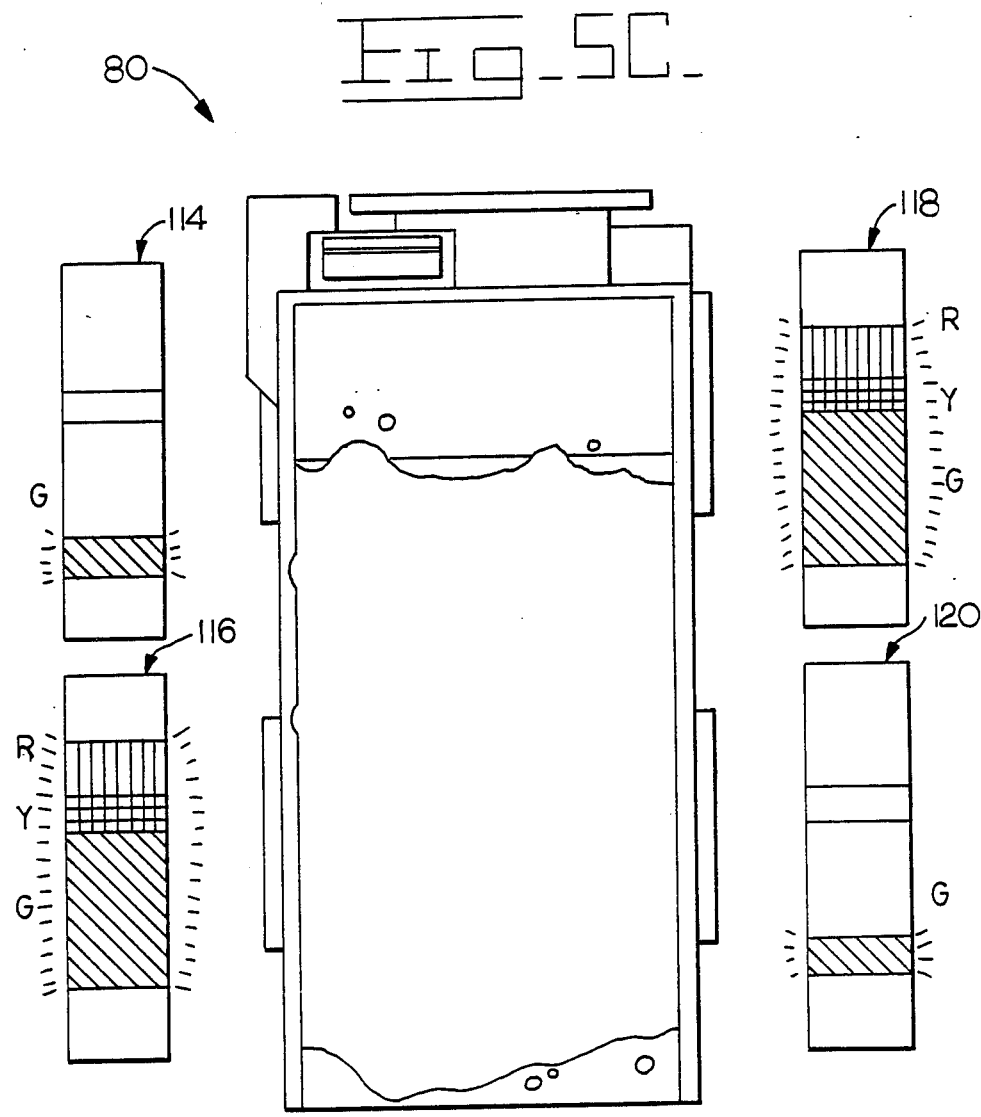
Fig_5C_

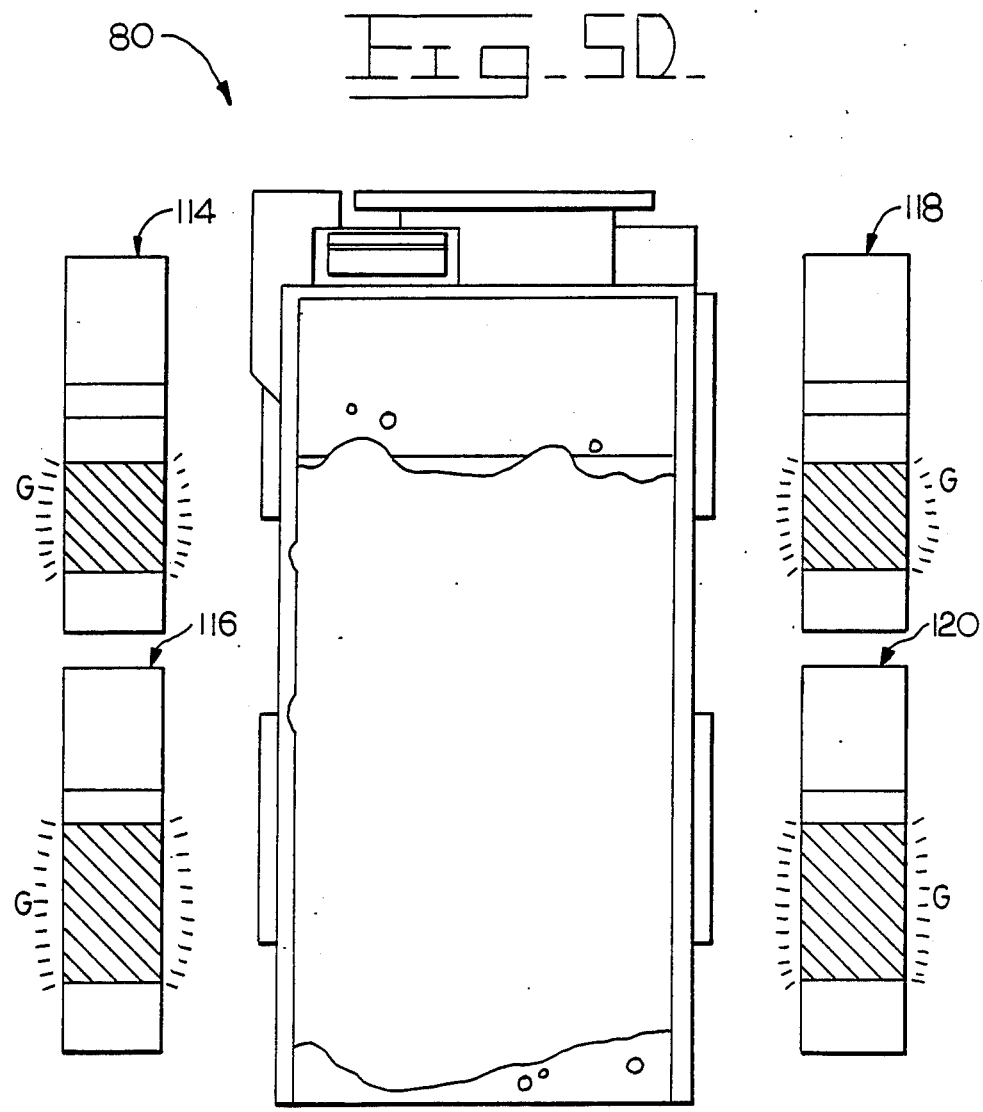

METHOD FOR DISPLAYING LOAD DISTRIBUTION BY MONITORING A WORK VEHICLE SUSPENSION

This is a continuation of Ser. No. 079,559, filed July 30, 1987, now abandoned.

TECHNICAL FIELD

This invention relates generally to an apparatus for automatically determining the distribution of payload in a work vehicle, and more particularly, to an apparatus for automatically determining the distribution of payload in a work vehicle by monitoring strut pressures.

BACKGROUND ART

In the field of off-highway trucks used in mining operations, for example, it is desirable that an accurate record be kept of the quantity of material removed from the mining site. This information can be used to calculate mine and truck productivity as well as aid in forecasting profitability and work schedules.

Other systems, as disclosed in U.S. Pat. No. 4,635,739 issued to D. Foley et al. on Jan. 3, 1987, have shown that strut pressure can be an accurate indicator of payload. The apparatus disclosed therein includes an electronic control which monitors each of the strut pressures, compensates for various inaccuracies introduced by load distribution and vehicle attitude, and correlates this information into actual payload. This payload information allows the truck to be operated efficiently near its maximum capacity without promoting undue vehicle wear. An overloaded vehicle hastens tire and frame damage.

Improper payload distribution also promotes vehicle wear. Strut, frame, and tire damage can occur easily if the payload is distributed unevenly. The payload monitor accurately calculates payload with an unsymmetrical distribution, but does not fully protect the vehicle frame and suspension from overloads. Merely determining the actual payload to prevent overloading is not sufficient to fully protect the vehicle, since uneven distribution causes overloads on portions of the vehicle.

Heretofore, there have been no devices for displaying the payload distribution of a dump truck to an operator. Some prior art shows weight distribution on each axle for multi-axled vehicles. However, this information is inadequate for very large off-highway dump trucks. Many trucks of this type use electric motors to drive each side of an axle. If the load on one side is much larger than the load on the opposing side, then one electric motor works much harder than the other. The torque output necessary to move an excessive load can easily overdrive an electric motor. Repair and replacement of such motors is extremely expensive.

Truck operators often park incorrectly during loading. Level ground should be sought to prevent one strut from receiving much more load than another. For instance, parking with a rear tire on a small hill or grade can cause that portion of the truck to accept as much as 90 percent of the load, while an adjacent portion may exhibit a negative load. The implications of such a loading configuration are obvious. Suspension and frame damage can easily occur during loading from an improper loading position, due to the extreme load on the suspension structure and the torsional forces propagating through the frame.

The present invention is directed to overcoming one or more of the problems as set forth above.

DISCLOSURE OF THE INVENTION

An apparatus displays the distribution of a payload on a work vehicle. The vehicle has a plurality of hydraulic struts in supporting relation thereto. A means senses the internal pressure of preselected struts and delivers a plurality of first signals. Each of the first signals has a value responsive to the internal pressure of one of said respective struts. A means modifies each of the first signals, and delivers modified signals in response to the modification. Each modified signal is indicative of the payload supported by one of the respective struts. A visual display means receives the modified signals and displays respective visual signals in response to the magnitude of the modified signals.

Overloading of off-highway trucks causes many expensive failures. The frame, suspension, tires, electric motors, and lift cylinders all wear at accelerated rates when overloaded by an extreme payload. The total weight of the payload should not exceed the rated payload. However, even when this condition is met, poor load distribution transmits irregular forces through the suspension to the frame. Individual struts can experience damaging forces, while others experience negligible forces. Additionally, uneven load distribution conveys possibly destructive torsional forces to the vehicle's frame. Moreover, an extreme load on one corner of the vehicle overloads the electric drive motor on the associated wheel, due to the high output it must provide to move the load.

A monitor capable of displaying the actual or relative amount of payload being supported by each strut allows the loader operator to direct subsequent loads to the proper locations in the truck's dump body. Providing the operator with a tool that displays the load characteristics facilitates even loading, which reduces damaging forces. Merely knowing the total payload or the axle loads is insufficient. When the load is known on each suspension member, the operator receives more information and a greater amount of damage may be avoided.

BRIEF DESCRIPTION OF THE DRAWINGS

FIG. 4 illustrates a preferred embodiment of a visual display of the present invention;

FIG. 5a illustrates an operating example of the visual display;

FIG. 5b illustrates an operating example of the visual display

FIG. 5c illustrates an operating example of the visual display; and

FIG. 5d illustrates an operating example of the visual display.

BEST MODE FOR CARRYING OUT THE INVENTION

Figure 1:
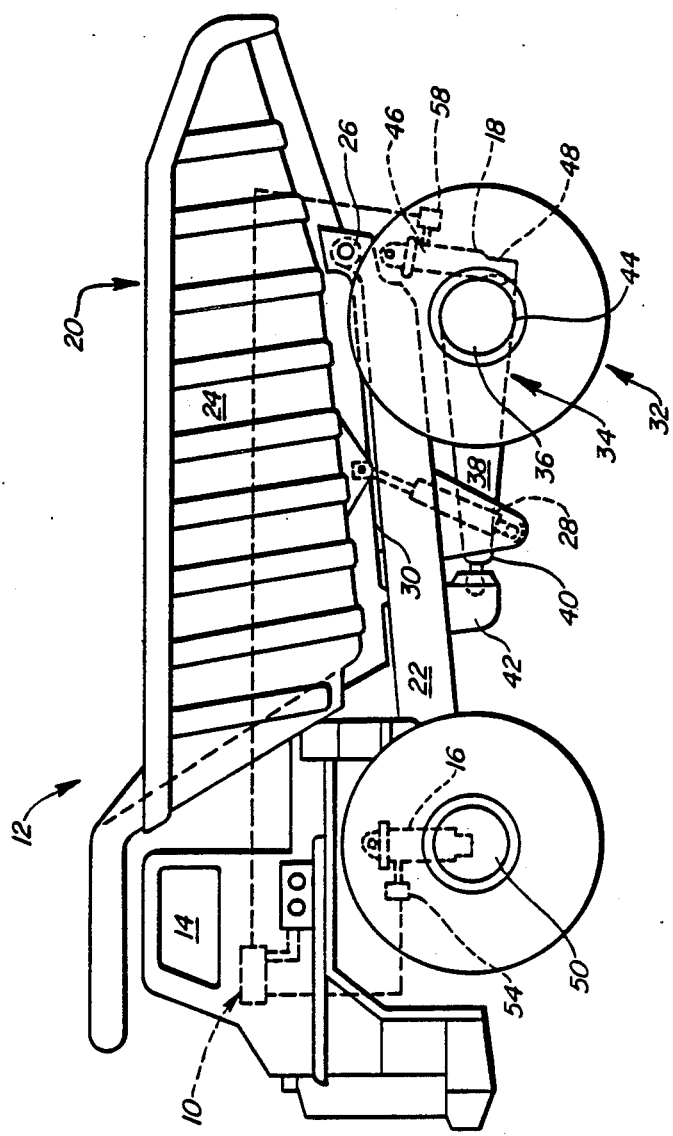
FIG. 1 is a diagrammatic view of an off-highway truck and showing the location of critical suspension components.

Referring now to the drawings, wherein a preferred embodiment of the present apparatus 10 is shown, FIG. 1 illustrates a work vehicle 12 which can be, for example, an off-highway truck 14. The truck has at least one front and one rear strut 16,18 disposed in supporting relation to a load carrying portion 20 of the work vehicle 12. The preferred embodiment has two front and two rear struts 16L,16R,18L,18R which are the gas-over-liquid type commonly known in the industry and not described herein. It is sufficient in the understanding of the instant apparatus 10 to recognize that the pressure of the fluid is indicative of the magnitude of the load applied to the strut 16,18, and that wide swings in the strut pressures are normal and even expected during vehicle travel, commonly referred to as "roading".

The load carrying portion 20 includes a vehicular frame 22 and dump body 24. The dump body 24 is connected to the frame 22 by pivot pin 26 and a hydraulic cylinder 28 such that the contents of the dump body 24 can be removed by controllably pressurizing the cylinder 28 to effect pivotal movement of the dump body 24 about the pivot pin 26. In the transport mode, the cylinder 28 is not pressurized and the weight of the dump body is transferred to the frame through the pivot pin 26 and a support pad 30 fixed to the frame 22.

The work vehicle 12 further includes a ground engaging portion 32 and a suspension means 34 for supporting the load carrying portion 20 in a manner to provide damped oscillatory motion between the ground engaging portion 32 and the load carrying portion 20. The suspension means 34 includes a rear axle housing 36 and an A-frame moment arm 38. The A-frame moment arm 38 has a first end portion 40 pivotally connected to the vehicular frame 22 by a socket 42, and a second end portion 44 fixedly connected to the rear axle housing 36. The first end portion 40 of the A-frame moment arm 38 is a king bolt arrangement, substantially spherical in shape and retained from lateral movement by the socket 42. The rear strut 18 has a first end portion 46 pivotally connected to the vehicular frame 22 and a second end portion 48 pivotally connected to the second end portion 44 of the A-frame moment arm 38.

During loading of the truck, as the payload increases, the load carrying portion 20 will be displaced in a direction toward the ground engaging portion 32. The rear strut 18 begins to compress while the A-frame moment arm 38 pivots about first end portion 40. A distance L2 is defined to be the distance between the first end portion 40 pivot point and the second end portion 44 pivot point of the arm 38. Therefore, it can be shown that the rear strut pressure differential is a function of the suspension means 34. Moreover, the rear strut pressure differential can be related to the reaction force R between a work surface and the ground engaging portion 32. A force S experienced by the rear strut 18 can be determined by measuring the internal pressure of the strut 18, subtracting the rear strut pressure corresponding to an unloaded truck, and multiplying the differential pressure by the area of the strut 18. A reaction force R is proportional to the payload of the vehicle 12 and can be assumed to act through the center of the rear axle housing 36 such that a summation of the moments about the pivot point of the king bolt would derive the following equation:

$$R = S * L2/L3$$
(eqn. 1)

where the horizontal distance between the first end portion 40 pivot point and the center of rear axle housing 36 is defined to be L3.

Similarly, the front strut 16 will be compressed as the load increases; however, the front strut is connected directly between the frame 22 and a front axle housing 50. A more straightforward relationship exists here in that a force F experienced by the front strut 16 can be determined by measuring the internal pressure of the strut 16, subtracting the front strut pressure corresponding to an unloaded truck, and multiplying the pressure by the area of the strut 16. The reaction force F between the ground engaging portion 32 and the work surface is substantially equivalent to the force F experienced by the front strut 16.

Figure 2:
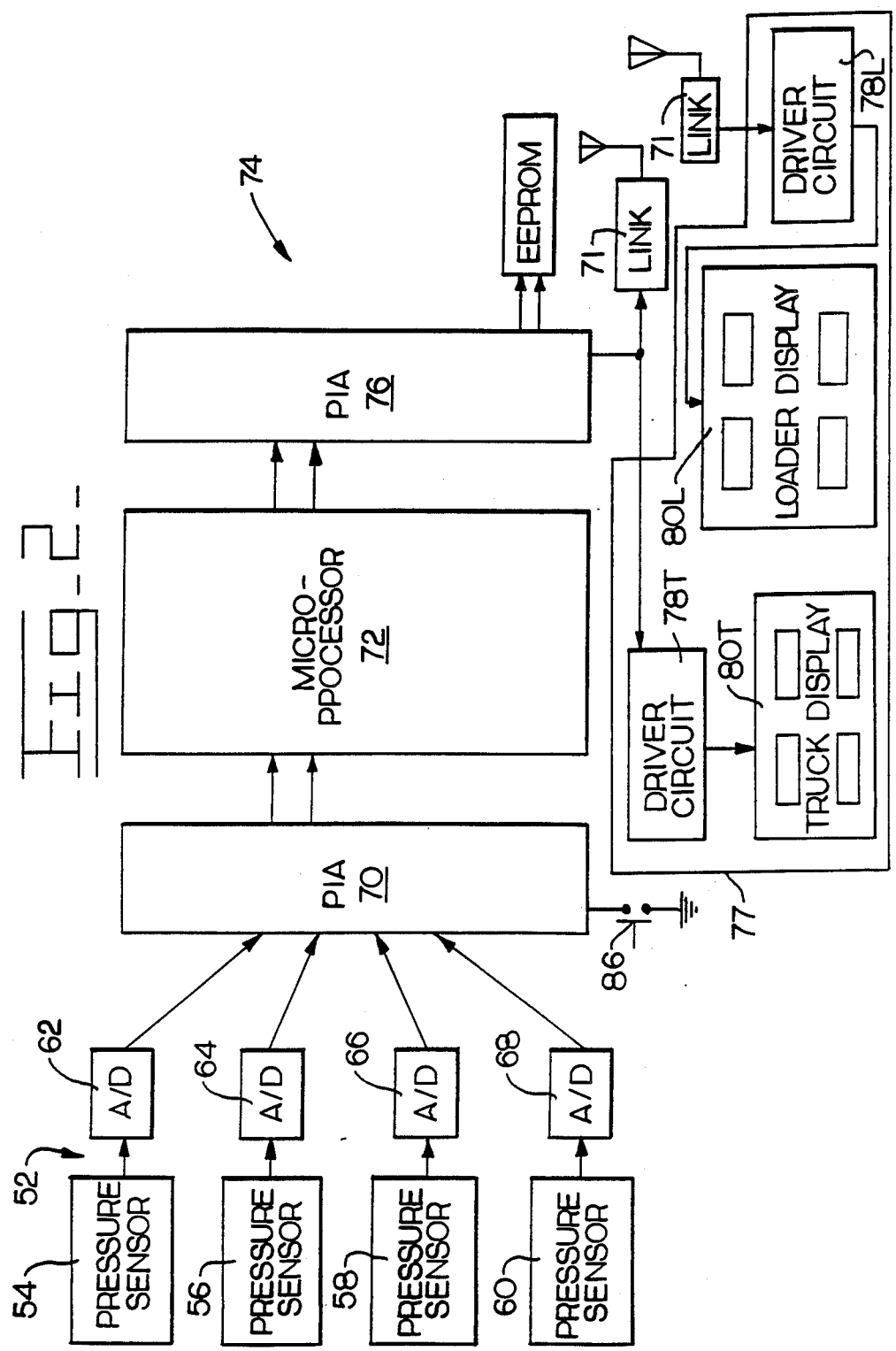
FIG. 2 is a block diagram of the suspension monitor.

The apparatus 10 is shown in FIG. 1 to illustrate the relationship between the work vehicle 12 and the location of the apparatus 10. A more detailed block diagram of the apparatus 10 is shown in FIG. 2 and diagrammatically illustrates a means 52 which senses the pressures of each of the struts 16,18 and delivers a plurality of signals each having a value responsive to the internal pressures of a respective strut. The means 52 includes a plurality of pressure sensors 54,56,58,60 of the type commercially available from Dynisco as part number PT306. The pressure sensors 54,56,58,60 are respectively associated with the two front struts 16L,16R and the two rear struts 18L,18R. Each of the pressure sensors 54,56,58,60 delivers an analog signal proportional to the magnitude of the pressure of the respective strut 16L,16R,18L,18R to respective analog to digital converters (A/D) 62,64,66,68. The A/D's 62,64,66,68 can be of the type commercially available from Analog Devices as part number AD575A. Other types of A/D converters have been contemplated by the inventor and the choice of the particular A/D disclosed herein is simply a matter of designer discretion. The selection of a device which provides an analog to frequency output is particularly well suited to the digital microprocessor environment disclosed herein; however, other similar devices could be easily substituted without departing from the spirit of the invention.

A peripheral interface adapter (PIA) 70 receives the digital frequencies output by the A/D converters 62,64,66,68 and delivers these signals to a microprocessor 72 under software control. In the preferred embodiment, the microprocessor 72 is part number 6809 provided by the Motorola Corp. The microprocessor 72 is programmed to have a means which modifies the front and rear strut pressure signals by applying respective unique correction factors thereto. These correction factors convert first signals, each having a value responsive to the internal pressure of one of said respective struts, into an indication of force or payload on an associated strut 16,18. The modified signals are transmitted via a second PIA 76 to a display driver 78T, which is associated with the truck. The driver 78T controls the truck's visual display 80T in response to the modified signals. The second PIA 76 also transmits modified signals to a communication link 71. The communications link 71 transmits the necessary information from the microprocessor 72 to a visual display driver 78L, which is associated with the loader. The driver 78L controls the loader's visual display 80L in response to the modified signals. The communication link 71 is preferably an infra-red link, but any suitable type of communications could be used without departing from the scope of the invention.

Figure 3:
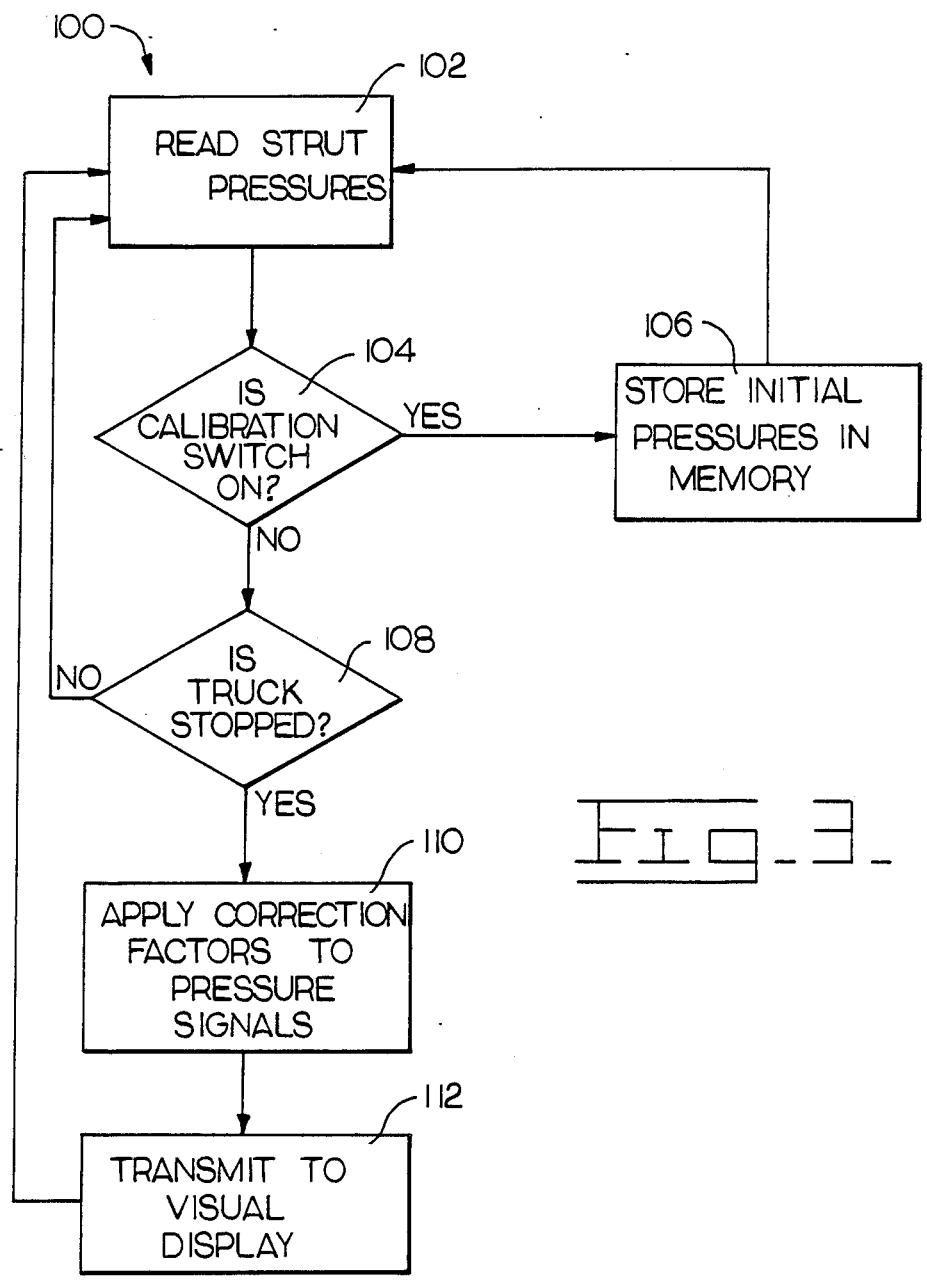
FIG. 3 is a functional software flowchart for one embodiment of the present invention.

Referring to FIG. 3 wherein a preferred embodiment of a software routine is illustrated in the form of a flowchart 100. In a block 102 the strut pressures are monitored. Control transfers to a decision block 104 where the software routine checks to determine if the calibration switch 86 has been actuated. The truck operator will typically actuate the calibration switch 86 at the beginning of a shift when the vehicle is known to be empty. When the calibration switch 86 is actuated, control transfers to a block 106, and pressure signals corresponding to an unloaded truck are loaded into memory. If the calibration switch 86 is not actuated, control transfers to a decision block 108 where vehicle movement is determined. The program monitors the strut pressures for a predetermined period of time to determine if the vehicle is moving. If the strut pressures are stable for the predetermined period, then the vehicle is assumed to be stopped. Of course, other suitable methods may be employed. For instance, a sensor monitoring the gearbox or transmission could transmit a signal containing the required information. If the vehicle is stopped, control passes to a block 110 where the strut pressure signals are modified. Respective correction factors are applied to each pressure signal. The correction factors modify the pressure signals to produce signals responsive to a load or a force on a respective strut 16,18. Next, control passes to a block 112 where the modified signals are transmitted to the visual display means 77 composed of a display driver 78 and a visual display 80. The display driver 78 receives the modified signals and delivers signals suitable to power the visual display 80 in response to the magnitude of the modified signals.

Referring now to FIG. 4 wherein a visual display 80 of the preferred embodiment is illustrated. The visual display 80 uses four elements 114,116,118,120. They are usually liquid crystal displays, light emitting diode arrays, or analog type gauges. In the preferred embodiment, the elements have a generally rectangular configuration, however a wide variety of configurations may be substituted without departing from the scope of the invention. Furthermore, the visual display elements 114,116,118,120 are arranged in a generally rectangular configuration, wherein each element is representative of a corner of the vehicle. While most of the apparatus 10 resides on the truck, the visual display means 77 is usually located on both the truck and the loader. A communication link 71 transmits the necessary information from the microprocessor 72 to the loader's visual display driver 78L. The driver 78L powers the elements 114,116,118,120 of the loader's visual display 80L, which displays visual signals in response to the magnitude of the respective modified signals.

The elements 114,116,118,120 are generally divided into four sections R,Y,G,B. Each section provides the operator with a different piece of information about the load distribution. Typically, the visual signals provided by the elements 114,116,118,120 vary in both color and magnitude in response to the magnitude of the modified signals. If analog gauges are used, such as those with d'arsenal movements, the pointer will point to color ranges on the face of the guage. This imparts to the operator information at a glance. This information allows the truck operator to position the truck properly for receiving a load, and also allows the loader operator to load the truck properly.

FIGS. 5a, 5b, 5c, and 5d illustrate a poor loading position, a proper loading position, a poor load distribution, and a proper load distribution, respectively. Referring to FIG. 5a, assume the truck is awaiting a load, while parked on a grade. Sections 'G', 'Y', or 'R' of one or more elements 114,116,118,120 illuminate depending on the severity of the grade, while section 'B' of one or more of the other elements 114,116,118,120 illuminate. Sections 'G', 'Y' and 'R' indicate positive loads, and section 'B' indicates a negative load. This informs the truck operator that even in the empty state, the truck is poorly positioned since the load on one or more struts is positive, while the load on others is negative. A positive load corresponds to strut pressure increasing past a preselected point which is equated to an empty state, and a negative load corresponds to strut pressure decreasing below the setpoint. The larger the positive or negative load, the higher the magnitude of the respective lights. Typically, the elements act as bar graphs, so that higher loads cause more portions of the element to illuminate. Ideal loading conditions exist when no portions of the elements are illuminated, or when small portions of sections 'G' are illuminated, as is shown in FIG. 5b.

FIG. 5c shows an example of poor load distribution. Two elements 114,120 show very small positive loads associated with their respective struts 16L,18R, depicted by the small portions of the sections 'G' which is illuminated. Conversely, the other elements 116,118 show extreme overloads on their respective struts 16R,18L, depicted by the sections 'G' and 'Y' being fully illuminated along with a portion of the section 'R'. The loader operator should dump the next loads in portions of the dump body corresponding to the small loads in an effort to evenly distribute the load. In this case, the next loads should be placed be placed in the front left and rear right of the damp body 24. FIG. 5d shows an ideally loaded truck. The display in this condition has large portions of the section 'G' illuminated. This informs the loader and the trust operators that the truck is evenly loaded and near rated capacity.

Industrial applicability

Assume that the apparatus 10 is mounted on an off-highway truck 12. At the beginning of a shift, the truck operator actuates the calibration switch 86 while the truck is empty and stationary. If the strut pressures are stable for a predetermined period of time, then the initial pressures are input to the microprocessor 72. These pressure signals correspond to pressures of an empty truck. Now the truck operator moves to a work site, and prepares to receive a load. The visual display 80 will display the relative loads on each strut when the truck is stopped. The operator moves the truck until small portions of the sections 'G' of the elements 114,116,118,120 are illuminated. This indicates that the truck is in an ideal position to receive a load.

As the loader operator dumps portions of the load in the dump body 24, his display 80L conveys information about load distribution. Subsequent loads are placed in locations having a smaller load distribution. Of course, the truck operator may reposition the truck during loading to improve underfoot conditions. The ideal loaded condition exists when all of the 'G' sections of the elements 114,116,118,120 are fully illuminated. When portions of the 'R' sections are lit, an overload condition exists on the associated struts. Normally, during loading all struts show positive pressures, so the 'B' sections of the elements 114,116,118,120 are not illuminated.

Other aspects, objects, and advantages of this invention can be obtained from a study of the drawings, the disclosure, and the appended claims

I claim:

1. An apparatus for displaying the distribution of a payload loaded onto a work vehicle by a separate loading vehicle, said work vehicle having a plurality of hydraulic struts in supporting relation to the payload comprising:
   means for sensing the internal pressure of preselected struts and delivering a plurality of first signals each having a value responsive to the internal pressure of one of said respective struts;
   means for modifying each of said first signals, and delivering modified signals in response to said modification, each modified signal being indicative of the payload supported by one of said respective struts;
   visual display means on the loading vehicle for receiving said modified signals, and displaying respective visual signals in response to the magnitude of said modified signals.

2. The apparatus, as set forth in claim 1, wherein said modifying means includes a microprocessor.

3. The apparatus, as set forth in claim 1, wherein said visual display means includes four display elements.

4. The apparatus, as set forth in claim 3, wherein said display elements are arranged in a generally rectangular configuration, each element being representative of a corner of work vehicle.

5. The apparatus, as set forth in claim 4, wherein said display elements have four sections, each section being representative of a land range on an associated strut.

6. The apparatus, as set forth in claim 5, wherein portions of preselected sections of said display elements illuminate in response to the magnitude of said respective modified signals.

7. The apparatus, as set forth in claim 1, wherein said visual display means includes four liquid crystal displays each having a generally rectangular configuration.

8. The apparatus, as set forth in claim 7, wherein said four liquid crystal displays are arranged in a generally rectangular configuration, each liquid crystal display being representative of a corner of said vehicle.

9. The apparatus, as set forth in claim 8, wherein said liquid crystal displays have four sections, each section being representative of a load range on an associated strut.

10. The apparatus, as set forth in claim 9, wherein portions of preselected section of said liquid crystal displays illuminate in response to the magnitude of said respective modified signals.

11. The apparatus, as set forth in claim 1, wherein said visual display means includes four light emitting diode arrays each having a generally rectangular configuration.

12. The apparatus, as set forth in claim 11, wherein said four light emitting diode arrays are arranged in a generally rectangular configuration, each light emitting diode array being representative of a corner of work vehicle.

13. The apparatus, as set forth in claim 1, wherein said visual signals vary in color in response to the magnitude of said second signals.

14. The apparatus, as set forth in claim 1, wherein said visual signals vary in magnitude in response to the magnitude of said modified signals.

15. A system for displaying the distribution of a payload on a work vehicle, said work vehicle having a plurality of hydraulic struts in supporting relation to the payload, comprising:
   means for sensing the internal pressure of preselected struts and delivering a plurality of first signals each having a value responsive to the internal pressure of one of said respective struts;
   a microprocessor for receiving and modifying each of said first signals, and for delivering modified signals in response to said modification, each modified signal being indicative of portion of the payload supported by one of said respective struts; and
   a visual display including four display elements for receiving said modified signals and displaying respective visual signals in response to the magnitude of said modified signals, each of the four elements having four sections and being representative of a corner of said work vehicle, each of the four sections being representative of a load range on said respective strut.

16. A system as set forth in claim 15, wherein the four display elements are arranged in a generally rectangular configuration.

17. A system as set forth in claim 15, wherein portions of preselected sections of the display elements illuminate in response to the magnitude of the respective modified signals.

18. A system as set forth in claim 15, wherein the four display elements each include a generally rectangular liquid crystal display having a generally rectangular configuration.

19. A system as set forth in claim 18, wherein the four liquid crystal displays are arranged in a generally rectangular configuration.

20. A system as set forth in claim 18, wherein portions of preselected sections of the liquid crystal displays illuminate in response to the magnitude of the respective modified signal.

21. A system as set forth in claim 15, wherein the four display elements are light emitting diode arrays each having a generally rectangular configuration.

22. A system as set forth in claim 21, wherein the four light emitting diode arrays are arranged in a generally rectangular configuration corresponding to the respective corners of the work vehicle.

23. A system as set forth in claim 15, wherein the visual signals vary in color in response to the magnitude of the modified signals.

24. A system as set forth in claim 15, wherein the visual signals vary in magnitude in response to the magnitude of the modified signals.

* * * * *